United States Patent
Hsu et al.

(10) Patent No.: US 6,528,550 B1
(45) Date of Patent: *Mar. 4, 2003

(54) CROSSLINKED FOAM OF ETHYLENE VINYL ACETATE COPOLYMER AND ACID COPOLYMER

(75) Inventors: Chin-Fu Hsu, Taipei (TW); Richard T. Chou, Hockessin, DE (US); Wayne C. Whelchel, Newark, DE (US); Yun Tong Ou, Taipei (TW)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/602,310

(22) Filed: Jun. 23, 2000

Related U.S. Application Data

(60) Provisional application No. 60/142,033, filed on Jul. 1, 1999.

(51) Int. Cl.$^7$ ................................. C08L 23/26
(52) U.S. Cl. ................. 521/134; 521/135; 521/96; 521/93; 36/43
(58) Field of Search ................... 521/134, 135, 521/96, 93; 36/43

(56) References Cited

U.S. PATENT DOCUMENTS

| | | | |
|---|---|---|---|
| 4,073,844 A | * | 2/1978 | Wada et al. .................. 264/55 |
| 4,314,035 A | | 2/1982 | Hobes et al. |
| 4,331,779 A | | 5/1982 | Park ............................ 521/134 |
| 4,364,565 A | * | 12/1982 | Tomar ....................... 273/60 R |
| 4,480,054 A | * | 10/1984 | Enderle ....................... 521/84.1 |

FOREIGN PATENT DOCUMENTS

| | | | |
|---|---|---|---|
| AU | 626884 | 1/1990 | |
| DE | 3626349 A1 | * 2/1988 | ................... 521/134 |
| DE | 38 24 286 | 2/1990 | |

OTHER PUBLICATIONS

John (Jeong) Lee, Microcellular Cross–Linked EVA Foam by Injection Molding Process, *ANTEC '97*, 823, 2060–2064, '97.

PCT International Search Report for International application No. PCT/US00/17774, dated Nov. 13, 2000.

* cited by examiner

*Primary Examiner*—James J. Seidleck
*Assistant Examiner*—Melanie Bissett

(57) ABSTRACT

This invention relates to crosslinked polymer foam compositions of an ethylene vinyl acetate copolymer, an ethylene/acrylic acid copolymer or ionomer, and a crosslinking agent. Such compositions exhibit enhanced melt strength, as well as lower density and compression set. They are especially useful as midsoles or insoles for footwear.

20 Claims, 1 Drawing Sheet

CROSSLINKED FOAM OF ETHYLENE VINYL ACETATE COPOLYMER AND ACID COPOLYMER

This application claims the benefit of provisional Application No. 60/142,033 filed Jul. 1, 1999.

FIELD OF THE INVENTION

This invention relates to foams of ethylene vinyl acetate. This invention specifically relates to microcellular foams of ethylene vinyl acetate and ethylene/acrylic acid copolymer as well as improved methods of production.

BACKGROUND OF THE INVENTION

Ethylene and vinyl acetate (EVA) copolymers are well known items of commerce having a wide variety of applications. Ethylene vinyl acetate polymers are produced by copolymerizing ethylene and vinyl acetate monomer. As the bulky acetoxy group content increases, the polymer becomes more amorphous, and possesses increased flexibility, rubberiness, low temperature properties, tackiness and heat sealability. This thermoplastic material is therefore widely used in flexible packaging, hot melt adhesives, electrical, medical and many other applications.

EVA resins can be conveniently crosslinked by both peroxide or irradiation to enhance mechanical properties and heat resistance. It is this crosslinking, coupled with the inherent rubbery nature of the polymer which makes EVA suitable for production of tough and abrasion resistant foams, especially suitable for footwear applications.

Crosslinked EVA foams can be manufactured by two methods—the ionizing radiation method and the chemical crosslinking method. The ionizing method, however, is restricted to pieces less than ¼ inches thick, and thus is of limited use. The chemical crosslinking method has found more commercial applicability. By crosslinking, the viscosity of EVA at high temperatures is increased and the individual cell is kept in a stable condition without rupture or agglomeration. Low-density microcellular foam can be obtained. By selecting the vinyl acetate (VA) content, the EVA foam is flexible and highly resilient with easy coloring and adherent to other materials. The application is used widely in shoe soles, sandals and cushion materials.

The prevalent chemical crosslinking method for producing microcellular cross-linked EVA foams is the compression molding process. Although this process produces high quality foam, it requires long processing time and generates a high level of scrap. A press-molding foam process involves many steps: compounding, press molding into foam, cutting into shape, then press molding into a final product. The process is long, tedious and labor intensive. Improving productivity would be highly desirable, as well as improving foam performance to achieve lighter density and improved properties.

The injection molding process was developed more than ten years ago to overcome the drawbacks of compression molding. This process has not been widely accepted due to the lack of high quality consistent compounds to reproduce exactly the same size from shot to shot over production cyles lasting several days. In such processes, achieving a balance between foam density and performance properties (e.g. compression set) can be difficult to attain. See, e.g., "Microcellular Crosslinked EVA Foam By Injection Molding Process", John Lee, 2060/ANTEC, 97.

There is a continued need to improve EVA foam properties, especially to improve compression set resistance for lower density EVA foams. A need also exists to develop EVA compounds that can enable shorter, more cost-effective processes to produce EVA foam.

SUMMARY OF THE INVENTION

Figure 1:
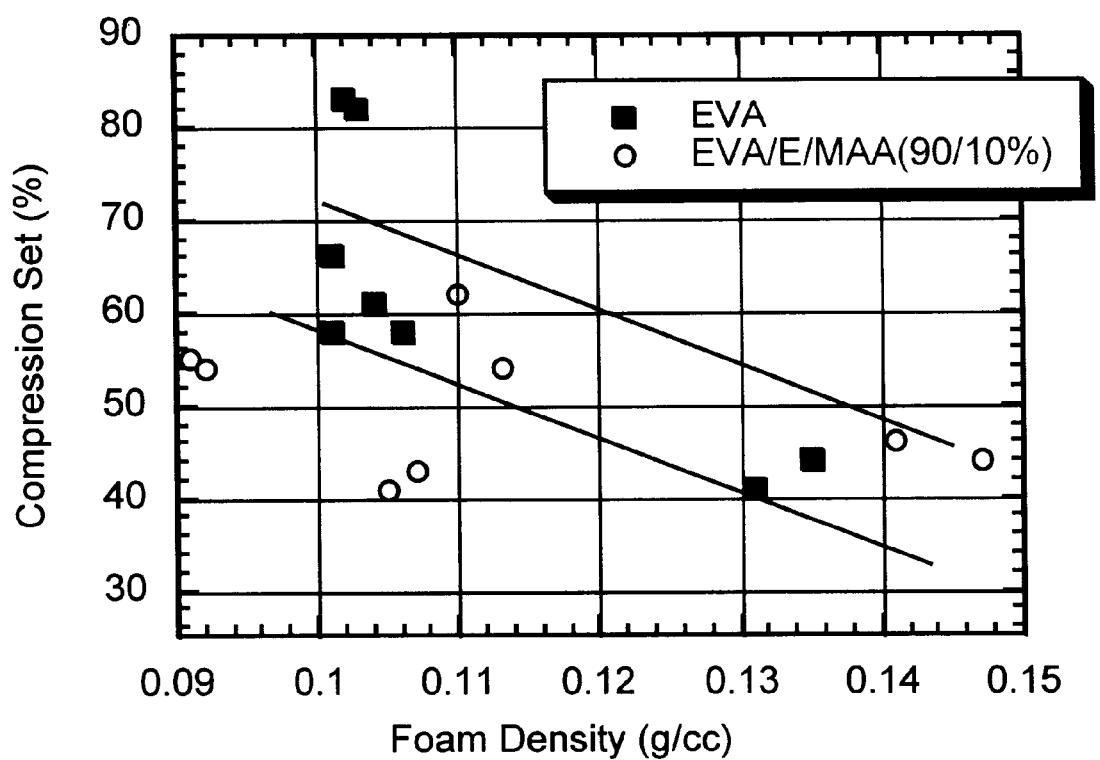
FIG. 1 is a plot of foam compression set v. foam density of the foams listed in Table I and Table II.

The invention herein provides a crosslinked polymer foam composition comprising (a) an ethylene vinyl acetate copolymer, (b) an ethylene/acrylic acid icopolymer, and (c) a crosslinking agent.

The invention herein also provides a crosslinked polymer foam composition comprising about 20 to about 98% by weight of ethylene vinyl acetate copolymer;

about 2 to about 80% by weight of ethylene/acrylic acid copolymer;

about 0.2 to 1.5% by weight of crosslinking agents;

about 0.5 to about 10% by weight of blowing agent or agents;

and optionally other additives;

wherein all weight percentages are based on the combined weight of ethylene vinyl acetate copolymer and acid copolymer.

Also provided is a crosslinked polymer foam composition comprising a. about 20 to about 98% by weight of ethylene vinyl acetate copolymer or a polyolefin;

b. about 2 to about 80% by weight of ethylene/acrylic acid copolymer or ionomer;

c. about 0.2 to 1.5% by weight of crosslinking agents;

d. about 0.5 to about 10% by weight of blowing agent or agents; and e. optionally other additives;

wherein all weight percentages are based on the combined weight of ethylene vinyl acetate copolymer and acid copolymer.

The invention also includes articles made from the claimed crosslinked polymer foam compositions, especially midsoles or insoles for footwear.

DETAILED DESCRIPTION

Definitions

In this disclosure, the word "copolymer" means a polymer polymerized from two or more monomers, and includes terpolymers. The more specific description 'ethylene carboxylic acid copolymer', 'ethylene/acrylic acid (E/AA) copolymer', and the like, is meant to include copolymers which may also have a third monomer present.

Ethylene/acid copolymers are well known in the art to be copolymers of ethylene with an olefinically unsaturated organic mono- or di-acid such as aacrylic or methacrylic acid, or maleic acid or fumaric acid or their anhydrides or half ester of the anhydride, such as ethyl hydrogen maleate, the acid (or anhydride) comprising about 1 to 10 mole percent of the total polymeric material. The acid copolymer may also contain up to 10 weight percent of an alkyl acrylate having an alkyl group with from 1 to 8 carbons. This is designated a C1–C8 alkyl acrylate. The ethylene/acid copolymers and their methods of preparation are well known in the art and are disclosed in, for example, U.S. Pat. Nos. 3,264,272, 3,404,134, 3,355,319 and 4,321,337. Commercial acid copolymers suitable for use in the invention herein are available from various sources, including the DuPont Company, Wilmington, Del.

Acid copolymers may be direct copolymers or graft copolymers. By the term 'direct copolymer' is meant a copolymer made by polymerization of monomers together, at the same time, as distinct from a graft copolymer where a monomer is polymerized on an existing polymer chain. When direct or graft acid copolymers have from 0 to about 90 percent of the carboxylic acid groups ionized by neutralization with metal ions, these are termed ionic copolymers, or "ionomers". These ionomers have solid state properties characteristic of crosslinked polymers and melt-fabricability characteristics of uncrosslinked thermoplastic polymers. Commercial ionomers suitable for use in the invention herein are Surlyn® ionomers, available from the DuPont Company, Wilmington, Del.

Ethylene vinyl acetate (EVA) is a copolymer of ethylene and vinyl acetate. EVA copolymers suitable in the process of the present invention are available from several sources including the DuPont Company, Wilmington, Del.

Description

The invention herein provides a crosslinked polymer foam composition comprising (a) an ethylene vinyl acetate copolymer; (b) ethylene/acrylic acid copolymer or ionomer, and (c) a crosslinking agent. The crosslinked foams herein offer a number of advantages over crosslinked foams of the prior art. The advantages include lower density, high resiliency and high strength. Also, the claimed foam structure can be manufactured in a wider foaming temperature window than conventional EVA foams, which can enable shorter molding cycle times and broaden processability.

The claimed crosslinked polymer foam composition comprises ethylene vinyl acetate copolymer for component (a). The EVA is preferably present in an amount of about 20% to about 98% by weight, more preferably about 70% to about 97% by weight and most preferably about 85 to about 97% by weight. All weight percentages of the crosslinked polymer foam composition are based on the combined total weight of components (a) and (b).

The preferred EVA copolymer contains about 15 to 35 weight percent of vinyl acetate, preferably 18 to 30 weight percent of vinyl acetate. The EVA may have a melt index (MI) of from 0.1 to 100, preferably 0.5 to 30, grams/10 minutes, as measured using ASTM D-1238, condition E (190° C., 2160 gram weight). As the proportion of this comonomer in the copolymer increases, the elastomeric properties of the copolymer improve, but its tackiness also increases. Above about 35 weight percent of vinyl acetate, the tackiness of the copolymer may be impractically high. Below about 15 wt. % of vinyl acetate, the elastomeric and flexibility properties of the copolymer tend to be unsatisfactory.

For component (b), the claimed crosslinked polymer foam composition may comprise ethylene/acrylic acid copolymer or ionomer thereof, preferably ethylene/acrylic acid copolymer. While not bound by any particular theory, it seems that the presence of acid copolymers ethylene/acrylic acid (E/AA), or related terpolymers, introduces a physical crosslinking, in addition to the chemical crosslinking caused by peroxide. This physical crosslinking appears to improve melt strength and enable lower density and superior foam properties.

The ethylene/acrylic acid copolymer or ionomer is preferably present in an amount ranging from about 2% to about 80% by weight, more preferably from about 3% to about 30% by weight, and most preferably about 3% to about 15% by weight. The ethylene/acrylic acid copolymer preferably contains about 4 to about 25 weight percent of acrylic acid, and more preferably about 8 to about 15 weight percent of acrylic acid. The ethylene/acrylic acid copolymer may have a melt index of from 0.1 to 500, preferably 1 to 100, most preferably 1 to 30 grams/10 minutes.

The ionomers useful in the invention herein preferably have a melt index of from about 0.1 to 100, more preferably about 0.5 to 20 g/10 minutes. The ionomers are preferably derived from an acid copolymer having about 4 to about 25 weight percent of acrylic acid, more preferably about 8 to about 15 weight percent of acrylic acid, and having a degree of neutralization ranging from about 20 to 70 wt. %.

The crosslinked polymer foam composition also comprises crosslinking agents, and preferably comprises blowing agents, activators for the blowing agents, and optionally other additives normally associated with such foam compositions.

Any free radical initiator crosslinking agent that is compatible with the foam formulation may be used. The preferred cross-linking agents are organic peroxides, usually dialkyl organic peroxides. The preferred organic peroxides include 1,1-di-t-butyl peroxy-3,3,5-trimethylcyclohexane, t-butyl-cumyl peroxide, dicumyl-peroxide (DCP), 2,5-dimethyl-2,5-di(tertiary-butyl-peroxyl)hexane and 1,3-bis (tertiary-butyl-peroxyl-isopropyl) benzene. Dicumyl peroxide (DCP) is the most preferred crosslinking agent.

The effect of crosslinking consists in increasing the viscosity and strength of the compound during foaming so as to settle the gas resulting from the decomposition in uniform and fine cells. Thus, concentration of the crosslinking agent added becomes important. When it is too low, the crosslinking would be insufficient, resulting in unstable cells and lack of uniformity in the foam. If the concentration is too high, excessive crosslinking may restrict foam expansion, leading to higher density foams, and also may prevent the decomposed gas from settling in uniform and fine cells, leading to abnormal foaming. Since the range of additive concentration suitable for foaming varies with formulation, such range will have to be determined for each formulation. Generally, the appropriate range of peroxide concentration in the foam formulation is about 0.2–1.5% by weight, i.e., 0.2–1.5 parts by weight of peroxide for each 100 parts by weight of the resin.

For reacting with acid copolymers and for further enhancing foam properties, the polymer, may optionally include a copolymer of the formula E/X/Y:

where E is the radical formed from ethylene and comprises about 40 to 90 weight percent of the E/X/Y copolymer, X is the radical formed from

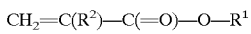

where $R^1$ is an akyl group with 2 to 8 carbon atoms, and $R^2$ is H or $CH_3$, and X comprises about 10 to 40 weight percent, preferably about 20 to 35 wt % of the E/X/Y copolymer, and Y is selected from the group consisting of glycidal methacrylate and glycidal acrylate and Y comprises about 0.5 to 20 weight percent, preferably about 3 to 8 wt % of the E/X/Y copolymer. The E/X/Y copolymer is preferably present in an amount ranging from about 0.5% to about 10% by weight of the combined total weight of EVA and acid copolymer.

The composition may also optionally include a polyethylene selected from the group consisting of low density polyethylene and linear low density polyethylene, including linear low density polyethylene formed using metallocene catalysts.

For the application herein, the preferred blowing agents is a chemical blowing agents as opposed to a physical blowing agent. Physical blowing agents are halocarbons, volatile organic compounds, or non-flammable inert atmosphere gases. The suitable chemical blowing agents are azodicarbonamide (ADCA), dinitroso-pentamethylene-tetramine (DPT), P-toluene sulfonyl hydrazide, and p.p'-oxybis (benzenesulfonyl hydrazide). For tailoring the expansion-decomposition temperature to the foaming processes, the preferred blowing agents may be either mixture of blowing agents or mixture of blowing agents with a blowing aid. For example, Vinylfor AK-2 (manufactured by Eiwa Kasei Chemical Co., Japan) is a mixture of of ADCA and DPT and blowing agent, and Uniroyal Chemical Celogen 765 is a modified ADCA. The preferred blowing agents are ADCA, mixtures of ADCA and modified ADCA.

Since the physical properties of a foam are very sensitive to changes in density, determination of the blowing agent concentration, which dictates foam density, to be used in foam formulation is important. A range of about 0.5% to about 10 wt % of blowing agents is preferred.

Blowing agent activators are often added to lower the decomposition temperature/profile of blowing agents. Typical blowing agent activators are metals in the form of oxides, salts or organometallic complexes. The preferred activators are ZnO, Zn stearate and MgO. The activator or activators is normally added at the concentration of about 1.0 to about 10% by weight, preferably about 2.0 to about 6.0% by weight. The optimal activator concentration is dependent on the type of blowing agents. There are blowing agents available in the market which already contain activators and in such cases, the activator content would have to be adjusted.

Other additives can be optionally added. Such other additives would include any additives typically used in similar crosslinked polymer compositions. Other additives may include pigments, such as TiO2, and other compatible colored pigments. Adhesion promoters may be incorporated in the formulation to further improve adhesion of the expanded foam to other materilas. Fillers may be added, such as calcium carbonate, barium sulfate, and silicon oxide. Nucleating agents either in pure form or in concentrate form may also be included. The preferred nucleating agents are CaCO3 and SiO2. Rubber may be aded to improve rubber-like elasticity. Natural rubber, SBR, polybutadiene or ethylene propylene terpolymer can be used. Stabilizer additives, such as antioxidants, UV absorbers, flame retardants. Processing aids may also be included, such as Octene R-130 (manufactured by Octene Co., Taiwan). The Octene R-130 used in the exampless is a concentrate containing $SiO_2$, $CaCO_3$ and an undisclosed adhesion promoter in a polyethylene matrix.

The resulting polymer foam composition is substantially closed cell. This is evidenced by the fact that for equivalent densities, foams of EVA and acid copolymer were found to exhibit lower helium densities than foams of EVA alone. This is an indication that more of the cells in the EVA/acid copolymer foam were closed. Particularly for an acid copolymer content in the range of about 3 to about 15 weight %, the acid copolymer has been observed to be uniformly dispersed within the ethylene vinyl acetate in micron-sized particles when analyzed by transmission electron microscopy.

The present foam structure may be manufactured by a number of methods, such as compression molding, injection molding and hybrids of extrusion and molding. The process comprises a first step of mixing ethylene/acrylic acid copolymer, EVA, and crosslinking agents under heat to form a melt, along with blowing agents and other typical additives, to achieve a homogeneous compound. The ingredients may be mixed and blended by any means known in the art such as with a Banbury, intensive mixers, two-roll mill, and extruder. Time, temperature, shear rate must be regulated to ensure optimum dispersion without premature crosslinking or foaming. A high temperature of mixing may result in premature crosslinking and foaming by decomposition of peroxides and blowing agents. Yet, an adequate temperature is necessary to insure good mixing of the two main polymers, EVA and acid copolymer (or ionomer) and the dispersion of other ingredients. EVA and acid copolymers can form a uniform blend when blended at temperatures of about 160° F.–240° F. (about 71° C.–116° C.). The upper temperature limit for safe operation depends on the onset decomposition temperatures of peroxides and blowing agents employed.

After mixing, in general shaping is carried out. Sheeting roll or calendar roll are often used to make appropriate dimension of sheet for foaming. Or an extruder may used to shape the foam compounds into pellets.

Foaming can be carried out in a compression mold at a temperature and time to complete the decomposition of peroxides and blowing agents. Pressures, molding temperature, and heating time are important operation variables. Or foaming can be carried out in an injection molding equipment by using foam compounds in pellet form. The resulting foam can be further shaped to the dimension of finished products by any means known in the art such as by thermoforming and compression molding.

The crosslinked polymer foam composition is useful for a variety of articles, but is especially useful in footwear applications, particularly midsoles or insoles.

EXAMPLES

Test Methods:
Part of the test compound was used to measured the crosslinking properties on MDR-2000 Rheometer (Alpha Technology Co., Ohio) according to ASTM-2084 at condition similar to the foaming condition. The maximum torque was recorded in Table I, Table II and Table III.

Type C (spring type) hardness tester of ASKER, Japan was used according to ASTM D2240 to test the hardness of the foam.

Compression set was measured according to ASTM D3754 at the condition of 50 C./6 hours.

Split tear was measured according to ASTM-D3574.

Compression strength was performed on an Instron Universal testing machine fitted with a compression cage deforming the foam samples at a uniform rate of 10 min./min. The stress required to produce compression strain up to 50% was determined. Where compressive stress was given by the force per unit area based on the original foam cross-section.

EXAMPLES 1–10

Comparative Examples A–D

Examples are listed in Table I, III and IV and Comparative Examples A–D are listed in Table II.

Table I lists the key properties of Example foams 1–4 of EVA/E/MAA blend. The foams were made at two foaming condition: 155 C./30 min., and 165 C./30 min. as decribed below.

Table II lists the key properties of Comparative examples foams A–D of EVA. The foams were made at two foaming condition: 155 C./30 min., and 165 C./30 min. as decribed below.

Table III lists the key properties of Example foams 5 and 6, of EVA/E/AA blend. The foams were made at two foaming condition: 155° C./30 min., and 165° C./30 min. as decribed below.

Table IV lists key properties of Example foams 7–10 of EVA/E/MAA, and EVA/ionomer blends of varied formulations. The foams were made at three foaming condition: 165° C./30 min., 175° C./10 min., and 185° C./10 min. as described below.

FORMULATION:

EXAMPLE 1: EVA (an EVA containing 21 wt. % vinyl acetate with an MI of 1.5)), 749 grams, E/MAA (an E/MAA containing 9 wt. % methacrylic acid with an MI of 3), 81.8, grams, Dispersion aid (R-130, manufactured by Octene Co., Taiwan), 24.2, DCP, 5 grams, Blowing agent (Vinylfor AK-2, manufactured by Eiwa Chemical Co., Japan), 57.2 grams, ZnO, 12.2 grams, Zn stearate, 2.7 grams, Stearic acid, 6.8 grams Examples 2–4 have the same formulation except the amount of DCP peroxide employed is different for Example 3 and Example 4 as indicated in Table I.

Example 5: EVA (an EVA containing 21 wt. % vinyl acetate with an MI of 1.5)), 749.3 grams, E/AA (an E/AA containing 9 wt. % acrylic acid with an MI of 10), 81.8, grams, Dispersion aid (R-130, manufactured by Octene Co., Taiwan), 24.2, DCP, 5 grams, Blowing agent (Vinylfor AK-2, manufactured by Eiwa Chemical Co., Japan), 57.2 grams, ZnO, 12.2 grams, Zn stearate, 2.7 grams, Stearic acid, 6.8 grams.

EXAMPLE 6 has the same formulation of Example 5, except containing DCP, 7.0 grams.

Example 7: EVA(an EVA containing 21 wt. % vinyl acetate with an MI of 1.5), 749 grams, E/MAA (an E/MAA containing 9 wt. % methacrylic acid with an MI of 3), 82.8 grams, DCP, 6.7 grams, Blowing agent (Celogen AZ-130, Uniroyal Co.), 41.5 grams, ZnO, 50 grams, Zn stearate, 33.3 grams.

Example 8: EVA, 749 grams, ionomer (an Na salt of MAA with a MI of 2.8), 82.8, grams, DCP, 5.4 grams, Blowing agent (Celogen AZ-130, manufactured by Uniroyal Chemical Co.), 20 grams, ZnO, 33 grams, Zn stearate, 11.7 gramas, Stearic acid, 4.2 grams, CaCO3, 12.5 grams Example 9: EVA (an EVA containing 21 wt. % vinyl acetate with an MI of 1.5), 749 grams, E/MAA, (an E/MAA containing 15 wt. % methacrylic acid with an MI of 25) 82.8, grams, DCP, 5.4 grams, Blowing agent (Celogen 765, manufactured by Uniroyal Chemical Co., Japan), 25 grams, ZnO, 33 grams, Zn stearate, 11.7 gramas, Stearic acid, 4.2 grams, CaCO3, 12.5 grams Example 10: EVA (an EVA containing 21 wt. % vinyl acetate with an MI of 1.5), 749.3 grams, E/MAA (an E/MAA containing 9 wt. % methacrylic acid with an MI of 3), 82.8 grams, E/nBA/GMA (containing about 28 wt % n-butylacrylate and 5 wt % glycidal methacrylate, with an MI of 12), 40.4 grams, DCP, 4.6 grams, Blowing agent (Celogen AZ-130, Uniroyal Co.), 25 grams, ZnO, 33 grams, Zn stearate, 11 gramas, CaCO3, 12.8 grams.

Comparative Example A: EVA (an EVA containing 21 wt % vinyl acetate with an MI of 1.5), 839 grams, Dispersion aid, 24.4 grams, DCP, 4 grams, Blowing agent (Vinylfor AK-2), 57.8 grams, ZnO, 12.3 grams, Zn stearate, 2.8 grams, Stearic acid, 6.8 grams Comparative Examples B–D have the same formulation except the amount of DCP employed is different as indicated in Table II.

Sample Preparation:

Polymers and chemicals were weighed on a Mettler PC 2000 balance. This was followed by the mixing step. EVA and E/MAA and dispersion aid were charged into a Banbury (Bolling internal mixer). This mixer has a capacity of 1100 cc. The resins were fluxed at a temperature from 150° F.–230° F. (approximately 66° C. to 110° C.). After 1–2 minutes the remaining ingredients except peroxide and blowing agent were incorporated for 4–5 minutes. Then peroxide and blowing agents were added. The whole mixture then continued for 4–5 minutes, keeping the temperature under 230° F. (approximately 110° C.). The compound was discharged and transferred to a 6 inch×13 inch (approx. 15 cm×33 cm) Bolling OX two roll mill. The mill was oil heated and set for a temperature of 150° F. (approx. 66° C.). Batch size for the mill is about 500 to 1200 grams. Maximum speed was 35 feet per minute (approx. 1067 cm/min). Roll gap was adjusted to produce sheets for sample cutting (150 to 300 mils; approx. 0.38 cm to 0.76 cm)

Samples were cut on a Hudson Hydraulic Clicker, using a 3 inch×3 inch (approx. 7.6 cm×7.6 cm) die. They were weighed to 90 grams. The foaming process consisted of putting the 90 gram sample into a 3 inch×3 inch (approx. 7.6 cm×7.6 cm) beveled mold with an overall measurement of 6×6×½ inches (approx. 15 cm×15 cm×1.27 cm). This was put between two 9 inch×10 inch bx ¼ inch (approx. 23 cm×25 cm×0.6 cm) aluminum plates. The plates and sample were placed into an automatic PHI press. Samples were typically in the press for 10–30 minutes at temperature at 155° C.–185° C. under typical pressure of 3300 lbs (approx. 14679 N). The foam is formed instantaneously when the mold is opened at the end of the molding cycle.

TABLE I

Foam Properties of EVA/E/MAA Blend Foams

| Examples | Peroxide (wt %) | Foaming Condition | Max. Torque (kg-cm) | Density (g/cc) | Hardness (Asker C) | Comp. Set (%) | Split Tear Strength (kg/cm) |
|---|---|---|---|---|---|---|---|
| Example 1 | 0.6 | 155 C/30 min. | 1.94 | 0.11 | 33 | 62 | 3.4 |
|  |  | 165 C/30 min. | 1.85 | 0.091 | 24 | 55 | 2.0 |
| Example 2 | 0.6 | 155 C/30 min. | 2.09 | 0.113 | 34 | 54 | 3.2 |
|  |  | 165 C/30 min. | 1.87 | 0.092 | 26 | 54 | 1.8 |
| Example 3 | 0.72 | 155 C/30 min. | 2.40 | 0.141 | 45 | 46 | 3.3 |
|  |  | 165 C/30 min. | 2.30 | 0.107 | 33 | 43 | 1.8 |
| Example 4 | 0.84 | 155 C/30 min. | 2.77 | 0.147 | 49 | 44 | 2.2 |
|  |  | 165 C/30 min. | 2.63 | 0.105 | 35 | 41 | 1.6 |

TABLE II

Foam Properties of EVA Foam

| Comp. Examples | Peroxide (wt. %) | Foaming Condition | Max. Torque (kg-cm) | Foam Density (g/cc) | Foam Hardness (Asker C) | Compression Set (%) | Split Tear Strength (kg/cm) |
|---|---|---|---|---|---|---|---|
| Comp. Example A | 0.48 | 155 C/30 min. | 1.15 | 0.101 | 20 | 66 | 2.9 |
|  |  | 165 C/30 min. | 1.06 | 0.102 | 17 | 83 | 2.0 |
| Comp. Example B | 0.6 | 155 C/30 min. | 1.67 | 0.106 | 26 | 58 | 2.12 |
|  |  | 165 C/30 min. | 1.56 | 0.103 | 20 | 82 | 1.97 |
| Comp. Example C | 0.72 | 155 C/30 min. | 1.99 | 0.135 | 36 | 44 | 2.3 |
|  |  | 165 C/30 min. | 1.97 | 0.104 | 27 | 61 | 1.3 |
| Comp. Example D | 0.84 | 155 C/30 min. | 1.29 | 0.131 | 38 | 41 | 1.9 |
|  |  | 165 C/30 min. | 1.26 | 0.101(cracked) | 28 | 58 | 1.1 |

TABLE III

Foam Properties of EVA/E/AA Foam

| Examples | Foaming Condition | Max. Torque (kg-cm) | Foam Density (g/cc) | Compression Set (%) | Split Tear Strength (kg/cm) |
|---|---|---|---|---|---|
| Example 5 | 155 C/30 min. | 2.41 | 0.149 | 54 | 3.8 |
|  | 165 C/30 min. | 2.29 | 0.124 | 45 | 2.9 |
| Example 6 | 155 C/30 min. | 2.94 | 0.159 | 38 | 3.6 |
|  | 165 C/30 min. | 2.62 | 0.135 | 38 | 1.7 |

TABLE IV

Foam Properties of EVA/E/MAA Blend Foams

| Examples | Foaming Condition | Density (g/cc) | Comp. Set (%) | Hardness (Asker C) | Split Tear Strength (kg/cm) | Comp. Strength (kPa) |
|---|---|---|---|---|---|---|
| Example 7 | 155/30 | 0.076 | 53 | 29 | 1.7 | 141.2 |
|  | 165/30 | 0.075 | 56 | 24 | 1.2 | 124.4 |
|  | 175/10 | 0.076 | 56.7 | 25 | 1.8 | 121.4 |
| Example 8 | 165/30 | 0.179 | 63 | 55 | 3.2 |  |
|  | 175/10 | 0.177 | 60 | 53 | 5.2 | 356 |
|  | 185/10 | 0.162 | 59 | 52 | 2.7 |  |
| Example 9 | 165/30 | 0.156 | 58 | 53 | 2.2 |  |
|  | 175/10 | 0.153 | 51 | 50 | 3.1 | 303 |
|  | 185/10 | 0.138 | 56 | 47 | 2.2 |  |
| Example 10 | 165/20 | 0.189 | 32 | 55 | 3.2 |  |
|  | 175/10 | 0.181 | 51 | 56 | 3.3 |  |
|  | 185/10 | 0.168 | 59 | 55 | 3.4 |  |

Discussion of the Results

It is desirable for high performance foam to have both low density and low compression set. Generally, lower density foams, however, always trade-off key foam properties, such as compression set. As shown in Table I, the EVA/acid copolymer foams made at 165° C./30 minutes attained both low density and excellent compression set. By comparison, as shown in Table II, the EVA foams failed to attain both low density and excellent compression set. The superior performance of EVA/acid copolymer foam is achieved by the introduction of an ionic-crosslinking mechanism because of the presence of the acid copolymer. The discussion below demonstrates that the EVA foam cannot attain the same benefit.

When foam density decreases, less material is available to sustain foam properties. Therefore, it is expected that foam properties deteriorate as foam density decreases. To illustrate this point, FIG. 1 plots the compression set vs. foam density of the EVA and EVA/E/MAA foams as listed in Table I and Table II. It is seen that the compression set increases as the foam density decreases. The data in FIG. 1 mostly fall into a two-line envelope. However, the EVA/E/MAA foams made at 165° C./30 min., represented by the four data points at the lower left-hand corner, attained both low density and low compression set. In fact the four data points breaks away from the trend represented by the line-envelope.

Also the EVA/E/MAA blend foams can withstand the higher foaming temperatures for gaining fast and larger gas evolution of the blowing agents, and potentially faster cycle time. As shown in Table I, for EVA/E/MAA foams made at 165° C. attained lower densities than those made at 155° C. In contrast, for EVA foams, as shown in Table II, increasing foaming temperature from 155° C. to 165° C. failed to attain lower density foam. In fact, the EVA foams made at 165° C. demonstrated inferior properties.

Also it is noted that the lower density foams of EVA/E/MAA blend foams made at 165° C. not only have excellent compression set resistance, also exhibited good mechanical strength.

Table III lists the foam properties of Examples 5 and 6 of EVA/E/AA blend foams. Similar to EVA/E/MAA blend foams, EVA/E/AA blend foams also demonstrated excellent foam properties.

Table IV lists the foam properties of Examples 7, 8, 9 and 10. Those example foams further demonstrated the superior performance of EVA/acid copolymer foam. Noticeably, Example 7 demonstrated that an E/MAA modified EVA foam can be foamed to very low density foams, yet still retaining good compression set and tear strength. Also foaming at 185° C. of Example 7 formulation was demonstrated to be feasible. Higher foaming temperature shortens the cycle time. Example 9 used an E/MAA containing 15 wt. % MAA also demonstrated good foam properties and broad foam temperature window. In addition, the foams of Example 9 exhibited high compression strength. The foam made at 175° C./10 min. has compression strength of 303 kPa (approx. 44 psi) at 50% compression strain. Example 8 containing an ionomer also showed high compression strength. Example 10, containing an E/nBA/GMA copolymer that may preferentially reacts with acid copolymer, showed good foam properties.

While not bound by any particular theory or explanation, one possible explanation is that the presence of acid copolymers, such as E/AA or related terpolymers, introduces a physical cross-linking, in addition to the chemical cross-linking caused by peroxide, for enhancing the melt strength of foam compounds during foaming. Also, the enhanced melt strength, originated from physical crosslinking not from chemical crosslinking, enables the blend foams to attain lower density and excellent foam properties. As is seen by comparing the maximum torque values of the foam compounds listed in Table I and Table II, the EVA/E/MAA blend compounds have noticeably higher torque values than the EVA compounds at a given peroxide density for a given amount of peroxide content.

What is claimed is:

1. A crosslinked microcellular polymer foam composition comprising (a) an ethylene vinyl acetate copolymer; (b) an ethylene/acrylic acid copolymer; and (c) a free radical initiator crosslinking agent, wherein said crosslinked microcellular polymer foam composition has a foam density of 0.075 to 0.159 g/cc and a compression set (ASTM D3754 at 50° C. and 6 hours) of 62% to 38%.

2. A crosslinked microcellular polymer foam composition comprising
   a. about 20 to about 98% by weight of ethylene vinyl acetate copolymer;
   b. about 2 to about 80% by weight of ethylene/acrylic acid copolymer;
   c. about 0.2 to about 1.5% by weight of free radical initiator crosslinking agents;
   d. about 0.5 to about 10% by weight of blowing agent or agents; and
   e. optionally other additives;
wherein all weight percentages are based on the combined weight of ethylene vinyl acetate copolymer and ethylene/acrylic acid copolymer and wherein said crosslinked microcellular polymer foam composition has a foam density of 0.075 to 0.159 g/cc and a compression set (ASTM D3754 at 50° C. and 6 hours) of 62% to 38%.

3. The composition of claim 2 additionally comprising a polyethylene selected from the group consisting of: low density polyethylene and linear low density polyethylene.

4. The composition of claim 2 additionally comprising a copolymer of the formula E/X/Y, where E is the radical formed from ethylene and comprises 40 to 90 weight percent of said E/X/Y copolymer; X is the radical formed from

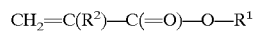

where $R^1$ is an alkyl group with 2 to 8 carbon atoms and $R^2$ is H or $CH_3$, and wherein X comprises 10 to 40 weight percent of said E/X/Y copolymer; and Y is selected from the group consisting of glycidyl methacrylate and glycidyl acrylate and wherein Y comprises 0.5 to 20 weight percent of said E/X/Y copolymer.

5. The composition of claim 4 wherein the copolymer of the formula E/X/Y comprises about 5 to about 10% by weight of the composition.

6. The composition of claim 2 additionally comprising
   f. about 0.1 to about 10% by weight of an activator or activators for the blowing agent.

7. The composition of claim 2 wherein the ethylene vinyl acetate copolymer ranges from about 70 to about 97% by weight and the ethylene/acrylic acid copolymer ranges from about 3 to about 30% by weight.

8. The composition of claim 2 wherein the ethylene vinyl acetate copolymer ranges from about 85 to about 97% by weight, the ethylene/acrylic acid copolymer ranges from about 3 to about 15% by weight.

9. The composition of claim 2 wherein the ethylene vinyl acetate copolymer contains about 15 to about 35 weight percent of vinyl acetate, having a melt index of about 0.1 to about 100.

10. The composition of claim 2 wherein the ethylene/acrylic acid copolymer contains about 4 to about 25 weight percent of acrylic acid, having a melt index of about 0.1 to about 500.

11. The composition of claim 2 wherein the crosslinking agent is an organic peroxide.

12. The composition of claim 6 wherein the activator for the blowing agent is selected from the group consisting of: zinc oxide, zinc stearate, and combinations thereof.

13. A crosslinked microcellular polymer foam composition comprising
   f. about 20 to about 98% by weight of ethylene vinyl acetate copolymer;
   g. about 2 to about 80% by weight of ethylene/acrylic acid copolymer or ionomer;
   h. about 0.2 to about 1.5% by weight of free radical initiator crosslinking agents;
   i. about 0.5 to about 10% by weight of blowing agent or agents; and
   j. optionally other additives;
wherein all weight percentages are based on the combined weight of ethylene vinyl acetate copolymer and ethylene/acrylic acid copolymer and wherein said crosslinked microcellular polymer foam composition has a foam density of 0.075 to 0.159 g/cc and a compression set (ASTM D3754 at 50° C. and 6 hours) of 62% to 38%.

14. The composition of claim 13 additionally comprising a polyethylene selected from the group consisting of: low density polyethylene and linear low density polyethylene.

15. The composition of claim 13 additionally comprising a copolymer of the formula E/X/Y, where E is the radical formed from ethylene and comprises 40 to 90 weight percent of said E/X/Y copolymer; X is the radical formed from

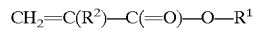

where $R^1$ is an alkyl group with 2 to 8 carbon atoms and $R^2$ is H or $CH_3$, and wherein X comprises 10 to 40 weight percent of said E/X/Y copolymer; and Y is selected from the group consisting of glycidyl methacrylate and glycidyl acrylate and wherein Y comprises 0.5 to 20 weight percent of said E/X/Y copolymer.

16. The composition of claim 13 additionally comprising:
   f. about 0.1 to about 10% by weight of an activator or activators for the blowing agent or agents.

17. A foam article made from the composition of claim 2.

18. A foam article made from composition of claim 13.

19. A midsole or insole for footwear made from the composition of claim 2.

20. A midsole of insole for footwear made from the composition of claim 13.

* * * * *